UNITED STATES PATENT OFFICE.

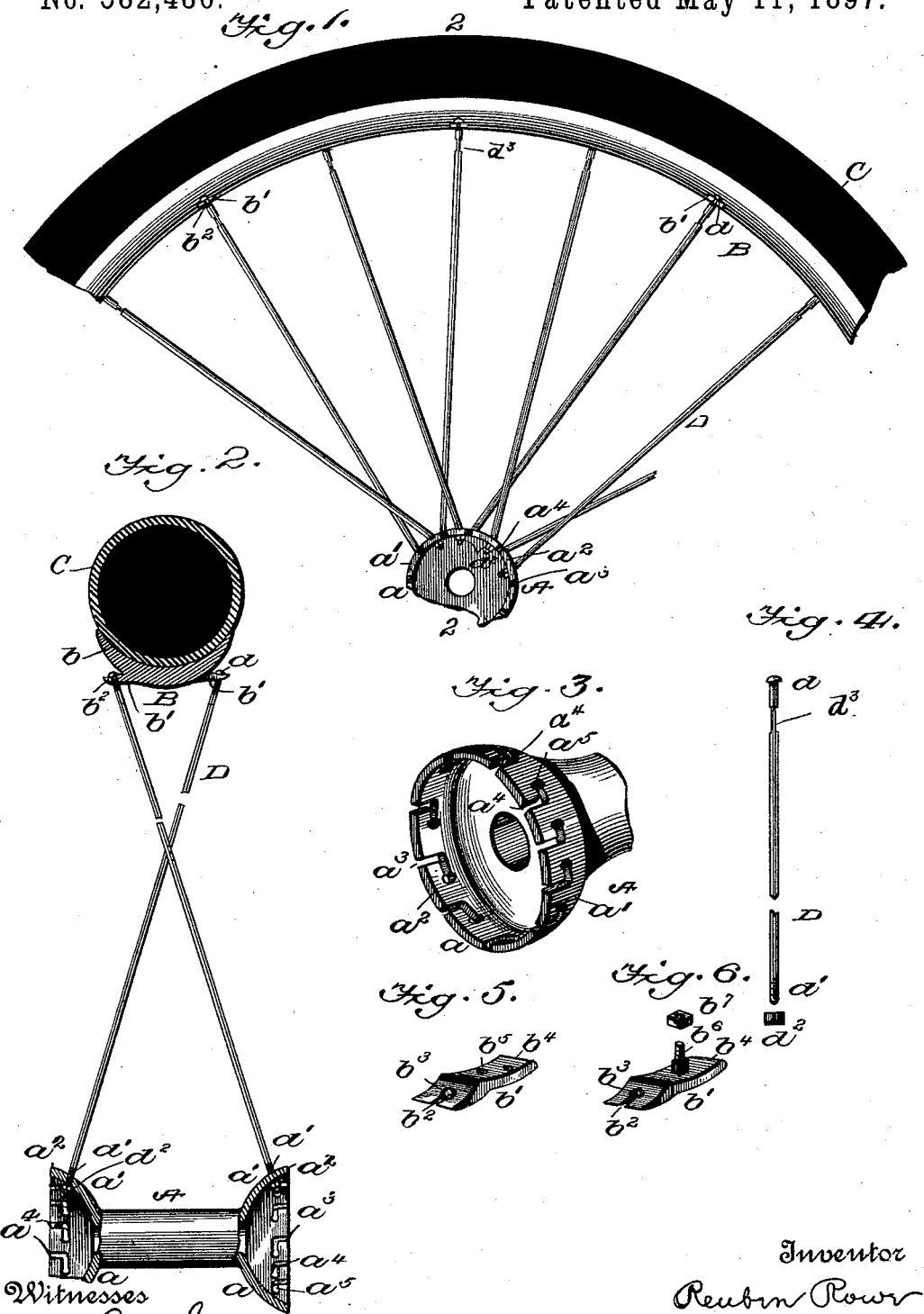

REUBEN ROWE, OF DOVER, NEW JERSEY.

WHEEL.

SPECIFICATION forming part of Letters Patent No. 582,486, dated May 11, 1897.

Application filed October 15, 1896. Serial No. 608,992. (No model.)

*To all whom it may concern:*

Be it known that I, REUBEN ROWE, of Dover, in the county of Morris and State of New Jersey, have invented certain new and useful Improvements in Wheels; and I do hereby declare the following to be a full, clear, and exact description of the invention, such as will enable others skilled in the art to which it appertains to make and use the same.

This invention relates to certain new and useful improvements in wheels, and applies more particularly to that class employed in connection with bicycles and the like.

In bicycle-wheels as heretofore constructed great difficulty is experienced, in the event of the breaking of a spoke, in replacing the broken member, it being frequently necessary to remove the rubber tire from the wheel-rim in order to bore out the metal remnant of the spoke projecting through the latter. The foregoing is the source of much annoyance and delay as well as expense, and it is the object of my invention to overcome these difficulties by producing a vehicle-wheel of such construction that the spokes thereof may be positioned or removed without interfering with the remaining parts of the wheel.

The invention will be hereinafter fully set forth, and particularly pointed out in the claims.

In the accompanying drawings, Figure 1 is a view in side elevation of a portion of my improved wheel, parts being broken away. Fig. 2 is a transverse section on the line 2 2, Fig. 1. Fig. 3 is a view of the wheel-hub. Fig. 4 is a detail. Figs. 5 and 6 are views of slight modifications.

Referring to the drawings, A designates the hub of my improved wheel, the same being constructed with any preferred form of cones, bearings, and axles. At each end $a$ said hub is provided with a peripheral flange $a'$, having an annular overhanging portion $a^2$, in which are formed slots or openings $a^3$. Each of said slots or openings is formed with approximately right-angular members $a^4$, leading in from the outer edges of said overhanging portions and terminating in circular holes or enlargements $a^5$.

B designates the wheel-rim, which is of concavo-convex form in cross-section and provided with the peripheral seat or groove $b$ for the rubber tire C. From the edges of said rim extend ears or projections $b'$, which are provided with slots $b^2$, leading in from the outer edges thereof and terminating in approximately circular holes or openings $b^3$. While it is obvious that the wheel-rim may be made with a flange in lieu of the ears or projections $b'$, yet I prefer the latter construction in view of the saving of material and consequent reduction in weight. These ears or projections are preferably formed integral with the rim. I may also form the ears or lugs $b'$ separate from the rim, as shown in Fig. 5. In that event said ears are provided with a projecting portion $b^4$, having holes or openings $b^5$ for the passage of screws, rivets, or the like, or they may be provided with a threaded lug $b^6$, on which works a nut $b^7$. (See Fig. 6.)

The spokes D are formed with upper headed ends $d$ and lower threaded ends $d'$, on which work binding-nuts $d^2$. Said spokes are also flattened for a short distance at $d^3$.

In practice the flattened portion of each spoke is first passed through the slots $d^2$ of one of the ears or projections $b'$ until the same reaches the circular enlargement $b^3$ thereof, when it is drawn downward until the headed end $d$ is in engagement with the edges of the latter. The lower threaded end of said spoke is then inserted in one of the right-angular slots $a^4$ of the hub A until the same reaches the enlargement $a^5$, whereupon the nut $d^2$ is screwed home and the tension of the spoke adjusted thereby.

In Fig. 6 I have shown a slightly-modified form of hub which is designed more particularly for use in connection with spokes having lower right-angular ends and adjustable at the wheel-rim, as now in common use. This form consists in forming the hub with a flange E, having a series of holes or openings $e$, provided with slots $e'$, leading therefrom in opposite directions and parallel with the periphery of said flange. The headed ends of the spokes are first inserted through holes or openings $e$, which are made large enough for this purpose, and then drawn up to the end of one of the slots $e'$, the tension being regulated at the rim end of the spoke. When I employ this form of hub, I reverse the spokes D, as heretofore described, bending the headed end thereof at right angles at $e^2$ and securing the threaded ends thereof to the ears or lugs b'. The headed ends are placed alternately inside and outside of flange E. This modified form of hub may also be employed where the threaded ends of the spokes are passed through threaded nipples in the rim of the wheel, as in the forms now in general use.

The advantages of my improved wheel are at once apparent. It will be particularly observed that one or more spokes can be readily and quickly removed and replaced without interfering with the remaining spokes or causing the removal of the tire, thereby resulting in a great saving of time, labor, and expense in making repairs. A wheel constructed in accordance with my invention is exceedingly strong and durable and is not liable to readily get out of order. It will also be noted that in the event of any of the ears or lugs of the rim being destroyed by accident the same can be quickly and easily replaced by one of the forms shown in Figs. 5 and 6.

I claim as my invention—

1. The herein-described improved vehicle-wheel, comprising a hub, a rim having slotted ears or lugs projecting laterally from its edges, and spokes extending from said hub and secured in the slots of said ears or lugs, as set forth.

2. The herein-described improved wheel, comprising a hub, a rim having slotted ears or lugs removably secured thereto, spokes having their ends extended through said slotted ears, and means for securing the inner ends of said spokes to said hub, as set forth.

3. The herein-described improved wheel, comprising a slotted hub, a rim having ears or lugs projecting laterally from its edges provided with narrow slots therein having circular enlargement, headed spokes having flattened portions, whereby said spokes may be passed through the narrowed portions of said slots into the enlargements thereof, and means for securing said spokes in the slots of said hubs and drawing said headed ends against said lugs above the circular enlargements of said slots, substantially as set forth.

4. The herein-described improved wheel, comprising a hub provided with overhanging flanges having right-angular slots therein terminating in circular holes or openings, a rim having slotted ears projecting from the edges thereof, spokes having threaded portions and headed ends, and extending through the slots of said hub and said ears, and nuts working on the threaded portions of said spokes, substantially as set forth.

In testimony whereof I have signed this specification in the presence of two subscribing witnesses.

REUBEN ROWE.

Witnesses:
WILFORD D. SURNBURGER,
ROBERT H. DOLAND.